2,901,940

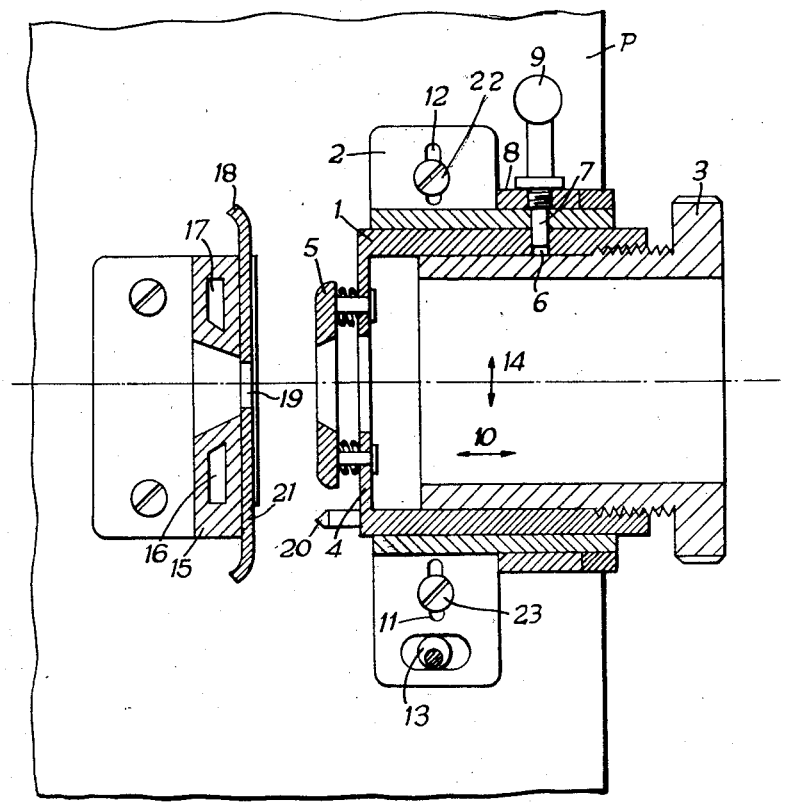

CINEMATOGRAPH APPARATUS

Alfred Rudolf Kuhnert and Bruno Johannes Rothe, Dresden, Germany, assignors to VEB Zeiss Ikon Dresden, Dresden, Germany Application September 26, 1955, Serial No. 536,607

2 Claims. (Cl. 88—17)

The invention relates to an arrangement for the adjustment of the picture framing in cinematographic machines.

Narrow film projectors are known, in which the picture framing adjustment is carried out by displacement of the optical axis, in that the objective or the objective carrier together with the mask of the picture field disposed in the film gate is constructed of variable height, the film gate with the objective carrier forming a unit for the insertion of the film and for the cleaning of the film passage, the film gate together with the objective carrier or a part of the objective carrier being movable in the direction of the optical axis.

This simple way of the adjustment of the picture framing in the case of high power machines, which operate with strong projection light source, affords difficulties in so far as the mask of the picture field in these machines may not lie behind the film, seen in the direction of projection, but must lie in front of the film in order to allow only the absolutely necessary light to fall on the film for the purpose of preventing excessive heating.

Now, in order to be able to use the above mentioned simple principle of the adjustment of the picture framing in such an arrangement of the mask of the picture field in front of the film, it is proposed according to the invention to mount the mask of the picture field movably in the direction of the running of the film and to connect it form-lockingly by coupling elements with the film gate or with the part of the objective carrier movable in the direction of the optical axis in the case of closed film gate.

A preferable form of embodiment of the invention provides that the mask of the picture field forms a part of the film track and that the film track is mounted movably in the direction of the running of the film.

Since in the case of water-cooled film tracks it is difficult to effect movements by the connections for the cooling liquid it is also proposed according to the invention to construct the mask of the picture field as part of the film track insert, which is mounted movably in the direction of the running of the film on the film track carrier, through which the cooling media flows.

By means of the invention the use of the principle of the adjustment of the position of the picture by alteration of the optical axis requiring little expense is possible also in the case of high power machines, without extensive additional means being necessary.

One exemplified embodiment of the invention is illustrated in the drawing, in which only the parts of a cinematograph projector necessary to an understanding of the invention are described.

On a side wall P of a projector casing, a cylinder 1 is guided in a supporting bracket 2. The cylinder 1 is closed at the front by the lens mounting 3 and at the rear by the film gate 4, which carries presser means 5. In the cylinder 1 is formed a spiral groove 6 in which engages, in known manner, a guide bolt 7 which is fastened in an adjusting ring 8 guided on the bracket 2, so that when the knob 9 is operated the film gate can be opened and closed in the direction of the double arrow 10. The bracket 2 is mounted to be adjustable in the direction of the running of the film (double arrow 14) by means of slotted guides 11 and 12, and guide bolts 22 and 23 fastened on the projector wall P. The adjustment is effected by turning the eccentric disc 13 by means of a handle (not shown). Opposite the film gate 4 is situated the film track carrier 15, which is provided with cavities 16 and 17 which are filled with a cooling fluid. The film track insert 18, in which the frame mask 19 is disposed, is mounted to be slidable in the direction of running of the film (double arrow 14) on the film track carrier 15. A coupling element 20 is fastened on the film gate 4 laterally outside the path of the film and, when the film gate is closed, engages in the recess 21 in the film track insert, so that on adjustment of the bracket 2 in the direction of the double arrow 14 the frame mask 19 is jointly adjusted to the same extent.

We claim:

1. An arrangement for the adjustment of the picture framing on cinematographic machines comprising a wall constituting part of the housing of the machine, a bracket adjustably mounted on the wall for longitudinal movement in the direction of movement of the film, said bracket having a bore whose longitudinal axis lies at right angles to the direction of movement of the film, a cylinder carried by said bracket and slidable in the bore thereof so as to be adjustable relative to the bracket in the direction of the optical axis, a lens mounting carried by said cylinder, a film gate also carried by said cylinder, a film track carrier mounted on said wall, a film track insert adjustably mounted on the film track carrier having an aperture therethrough to form a frame mask which lies in front of the film from the projection direction, said film track insert being adjustable in the direction of the movement of the film through the film gate, and coupling elements which are disposed on the film gate and on the film track insert respectively and which come into engagement with each other when the film gate is closed and automatically disengage each other when the film gate is opened.

2. An arrangement according to claim 1 in which the film track carrier has cavities through which a cooling medium flows.

References Cited in the file of this patent

UNITED STATES PATENTS

| 1,108,122 | Blair | Aug. 25, 1914 |
| 1,855,775 | Shapiro | Apr. 26, 1932 |
| 1,985,629 | Crabtree | Dec. 25, 1934 |
| 2,029,938 | Newman | Feb. 4, 1936 |
| 2,070,325 | Victor | Feb. 9, 1937 |
| 2,485,709 | Davock | Oct. 25, 1949 |
| 2,563,892 | Waller et al. | Aug. 14, 1951 |
| 2,617,327 | D'Arcy | Nov. 11, 1952 |
| 2,756,628 | Lang | July 31, 1956 |
| 2,775,161 | Thevenaz | Dec. 25, 1956 |

FOREIGN PATENTS

| 1,004,201 | France | Nov. 28, 1951 |
| 1,102,824 | France | May 11, 1955 |